July 22, 1930.   C. T. RAULE   1,771,097
AUTOMATIC GAUGE
Filed Jan. 18, 1928   4 Sheets-Sheet 1

Inventor:
Clifford T. Raule
By ... Atty.

July 22, 1930.    C. T. RAULE    1,771,097
AUTOMATIC GAUGE
Filed Jan. 18, 1928    4 Sheets-Sheet 3

Inventor:
Clifford T. Raule

By: [signature]
Atty.

July 22, 1930.                C. T. RAULE                 1,771,097
                            AUTOMATIC GAUGE
                   Filed Jan. 18, 1928      4 Sheets-Sheet 4
*Fig. 5.*
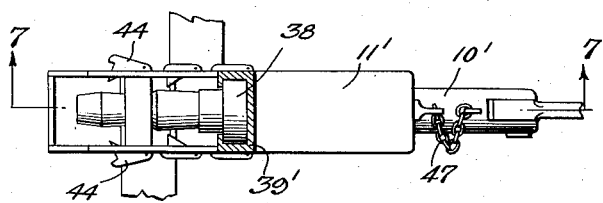
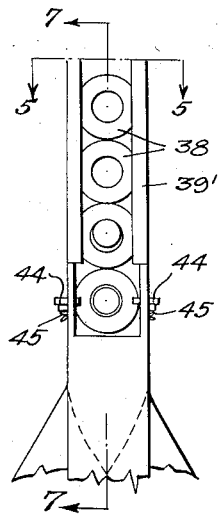
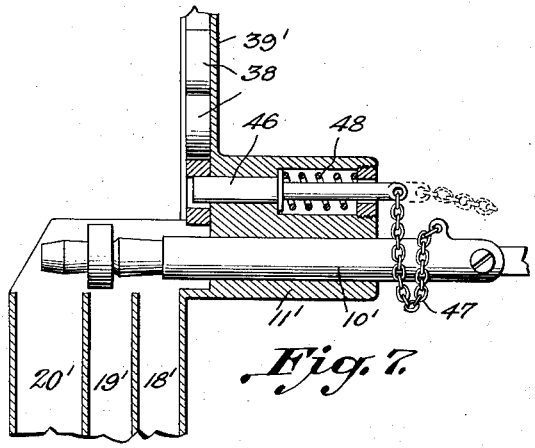
*Fig. 7.*
*Fig. 6.*
*Fig. 8.*
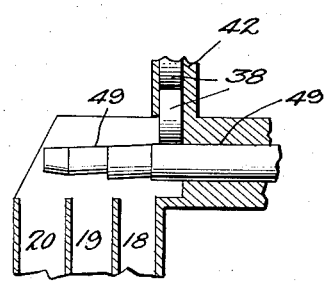
Inventor:
Clifford T. Raule.
By: W. Steell Jackson
                Atty.

Patented July 22, 1930

1,771,097

UNITED STATES PATENT OFFICE

CLIFFORD T. RAULE, OF BROOKLINE, PENNSYLVANIA

AUTOMATIC GAUGE

Application filed January 18, 1928. Serial No. 247,569.

My invention relates to an automatic gauge for sorting ball bearing races and the like according to internal bore and finds a particular use in cooperating with internal grinding machines for testing finished duplicate bores and sorting out any that are too large and any that are too small from those that are of right size within a predetermined set limit.

A purpose of my invention is to deliver the pieces one at a time so that their internal bores lie coaxially in the path of a longitudinally reciprocating measuring pin that presents toward the bores a plurality of step sections of successively larger diameters. The pin engages the bearings in the bores at the different steps to carry them different distances according to the size of the bore and I trap the bearings in the different positions for discharge to suitable different receptacles.
Further purposes will appear in the specification and in the claims.

I have elected to show two only of the forms of my invention, selecting forms that are convenient and efficient in operation and which well illustrate the principles involved.

Figure 1:
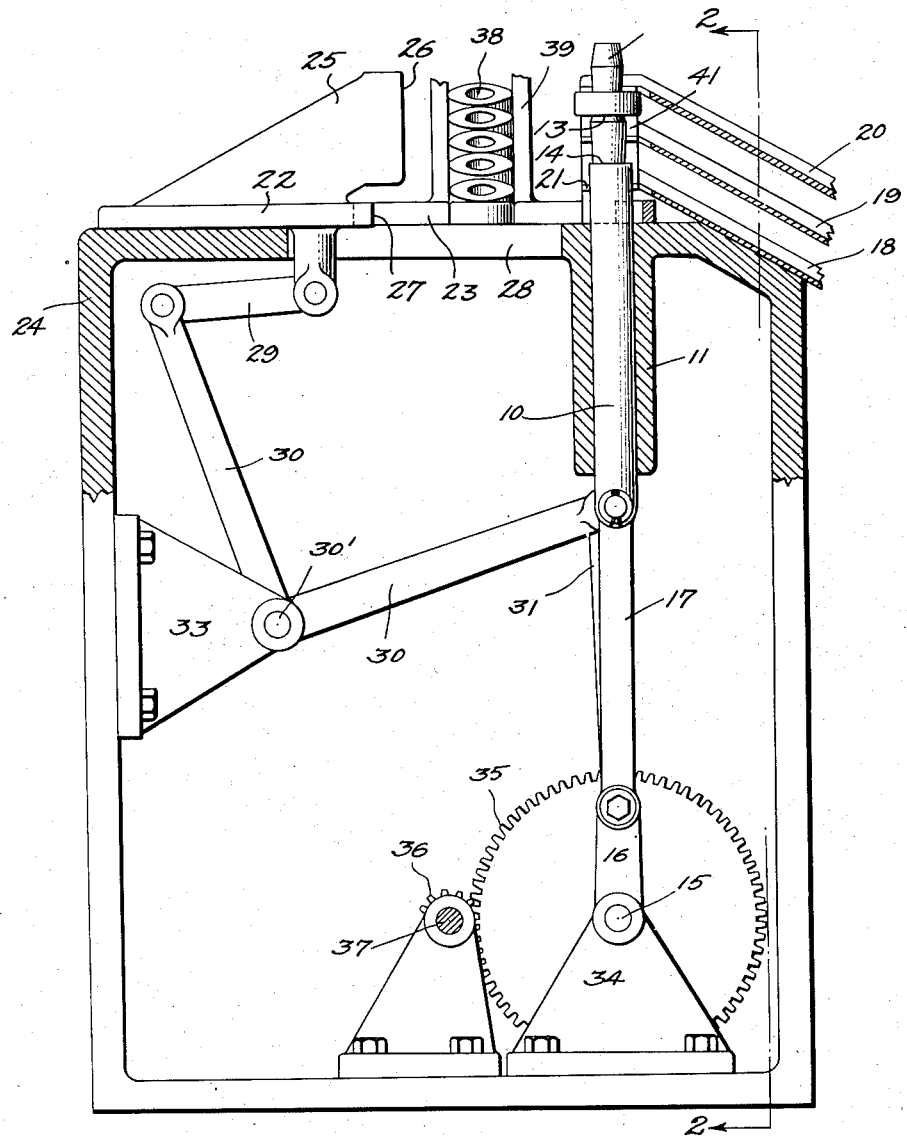
Figure 1 is a front sectional elevation of structure embodying one form of my invention, being a section of Figure 2 upon line 1—1.
Figure 2:
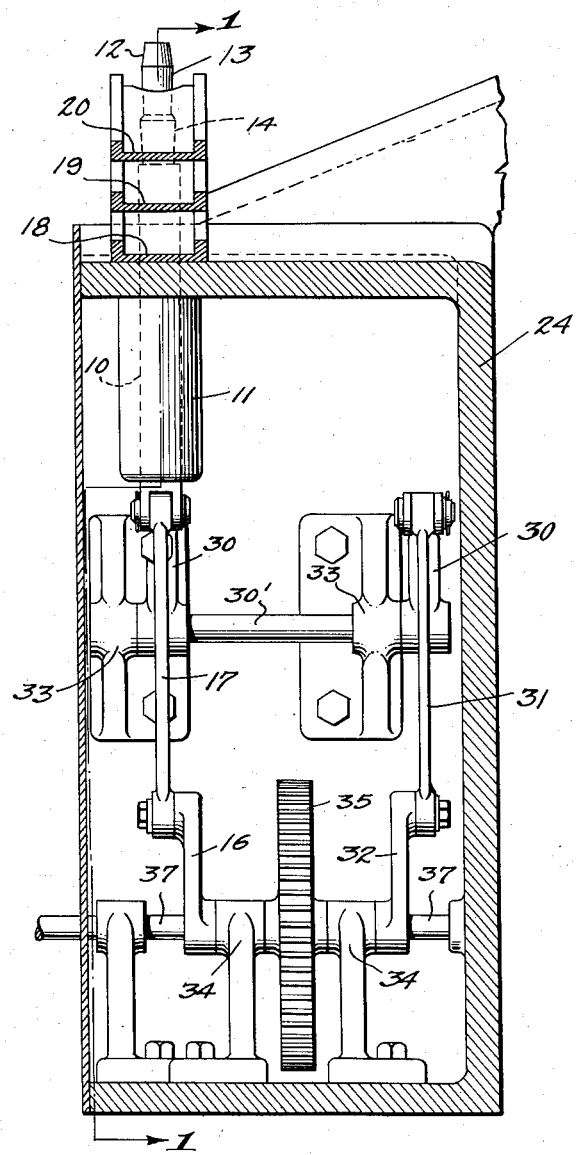
Figure 2 is a vertical section upon line 2—2 of Figure 1, taken in the direction of the arrows.

Figures 5, 6 and 7 show a different form of my invention, Figure 5 being a horizontal section upon the line 5—5 of Figure 6, Figure 6 a front elevation and Figure 7 a section upon the line 7—7 of Figure 5 or the corresponding line on Figure 6.

Figure 8 is a vertical section, corresponding to Figure 7 showing a further detail modification.

Like numerals refer to like parts in all figures.

Describing in illustration and not in limitation, and referring to the figures:—

If a piece has a bore too small it is engaged and lifted upon the first taper portion of the pin to the limit of its upward travel and left in its raised position when the pin descends.

My invention is intended for use upon any character of bored parts to which it may be adapted and in which it is desired to sort the parts according to bore, and I believe probably its widest application is in gauging the bores of ball bearings and the like that have been supposedly ground to size and in sorting them according to bore.

It may happen that some of the ground bearings are internally too small, others of right size within the allowed limits, and still others internally too large, and my invention sorts those internally too large and those internally too small from those that are of right size within predetermined allowed limits.

I position the pieces one after another so that their bores receive a longitudinally reciprocating stepped gauge pin. Any piece is lifted by the pin a distance that is progressively greater according as it is engaged and lifted by the first, second or third step of the pin as determined by the variant size of bore.

If the piece has the desired bore to within any predetermined limit it passes the first taper but catches upon a taper shoulder at the lower end of a straight section below the first taper. This shoulder raises it, but to a different and lower level than that to which the piece that is too small is raised by the first taper. The piece having the desired bore is left at this (lower) elevation when the pin goes down.

If the bore of the piece is too large it passes not only the taper but also the shoulder upon which pieces of right size catch and is finally lifted by a lower shoulder to a height that is different from and lower than that to which the pieces of right size are lifted, and is left at this lower position when the pin moves down out of the way.

Synchronized with the motion of the pin is a plunger feeding in new pieces in front of the pin before its rise and displacing the pieces already gauged during the preceding forward stroke of the pin.

In the structure illustrated the pin gauge

10 is chamfered or tapered for easy entry into the bore of the piece and is mounted to reciprocate in a vertical guide 11. It presents at its upper end vertically spaced step sections or shoulders 12, 13 and 14 of successively greater diameter for lifting the test pieces to heights that are different according to the test piece bore.

The reciprocation of the pin is effected by means of a rotating crank shaft 15, crank 16 and link 17 fastened between the crank and the lower end of the pin 10.

I mount downwardly sloping chutes 18, 19 and 20, one above another, that have inlets respectively adjacent the successive steps of the pin when the pin is in raised position and that deliver the tested pieces into different receptacles not shown and they have the same relative vertical spacing as that between the steps on the pin gauge.

At the entrance of each chute I mount a pair of horizontally spaced, upwardly swinging, narrow trap members 21 that project inwardly from opposite sides of the pin across the adjacent sides of test pieces carried by the pin. Each pair of traps is adapted to pass test pieces carried upon the upwardly moving pin by swinging upwardly and adapted to prevent the downward return of the pieces when the pin moves down, holding any piece in position for its delivery to one of the adjacent chutes.

A feed and delivery plunger 22 is mounted to reciprocate in a horizontal guideway 23 of the supporting structure 24.

The plunger 22 moves forward when the pin moves down and backward when the pin moves up, and is adapted in its forward stroke to deliver a new test piece to alinement with the pin (then down) and at the same time push the test piece left by the preceding stroke of the pin gauge upon one of the pairs of trap members off the trap into the adjacent delivery chute.

The plunger is provided with an upward projection 25. During the forward strokes of the plunger this upward projection moves between the trap members and pushes the trapped pieces into the chutes 18, 19 and 20. It presents a forward vertical face 26 that is suitably in front of the forward face 27 of the feed portion of the plunger.

A lower arm from the plunger 22 slides in a slot 28 through the bottom of the guideway 23 and is connected by link 29, rocker member 30 and link 31 to a crank 32 upon the crank shaft 15 that reciprocates the gauge pin, thus synchronizing the movement of the feed and delivery plunger with that of the gauge pin.

The shaft 30' of the rocker member 30 is mounted in suitable spaced bracket bearings 33 on the supporting structure. The crank shaft 15 is supported in spaced bearings 34 and driven in any suitable way, being shown carrying a gear wheel 35 that meshes with a driving pinion 36 upon a drive shaft 37.

Figure 3:
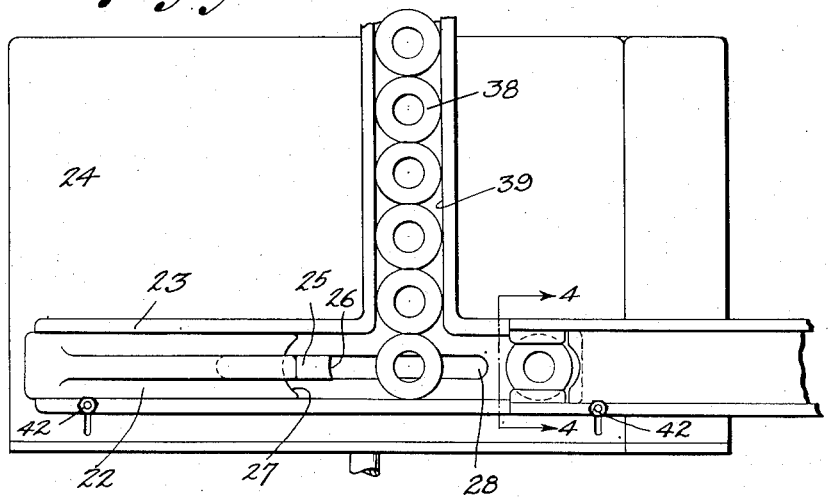
Figure 3 is a top plan view of structure shown in Figure 1.
Figure 4:
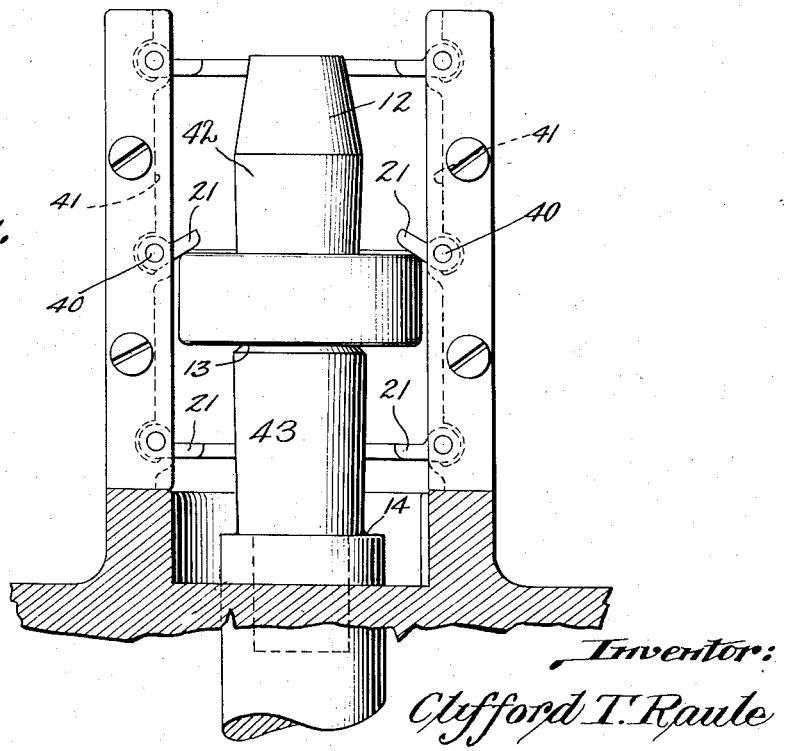
Figure 4 is a fragmentary vertical section to enlarged scale taken upon the line 4—4 of Figure 3 in the direction of the arrows.

The successive work pieces 38 (Figure 3) are delivered by gravity or by a suitable conveyer not shown into a feeding guideway 39 so as to press the pieces continuously forward toward the cross guideway 23.

The feed and delivery plunger operates in the latter guideway to aline the pieces with the reciprocating pin gauge.

When the pin gauge moves upwardly the plunger moves laterally away from the gauge, a new test piece pressing into the guideway 23 from the feedway 39 as soon as the plunger moves back from in front of the mouth of the feedway, the whole row of test pieces in the feedway moving a step forward when the forward piece in the feedway enters the forward guideway in front of the plunger.

The pin gauge, now in raised position, moves down out of the way and the plunger moves in to the right and pushes the work piece in front of it to stop above the pin gauge in substantial alinement with the reciprocating pin.

The pin again moves up and lifts the work piece upon one of its three step portions as determined by the bore of the piece.

If the bore is too small the piece is lifted upon the forward shoulder 12, if it is of right size within the predescribed limits it is lifted upon the intermediate shoulder 13 and if the bore is too large, the piece is lifted upon the lower shoulder 14, the distance lifted depending upon the size of the bore.

The trap members mounted upon opposite sides of the guideway 23 so as to be out of the way of the delivery member 25 are hinged at 40 to suitable opposing walls 41, and normally lie horizontal but flap up to pass a test piece carried up by the pin gauge, falling back to place as soon as the work piece has passed to hold the piece at the inlet of its delivery chute.

The traps extend inwardly toward one another sufficiently to support the work piece but do not extend far enough to be in the way of the delivery member 25 or to engage the pin gauge, and are at the inlets of the respective delivery chutes.

The upper chute receives those work pieces that are too small, the middle chute those pieces that have been properly ground to size, within the prescribed limit as determined by the difference in diameter between the second and third sections of the pin gauge, and the lower chute such as have been ground too large.

When used with a grinding machine, normally all of the gauged pieces should be lifted by the shoulder 13 of the pin gauge, temporarily supported on the intermediate trap members and be delivered into the middle chute, in that as long as the grinding machine is properly functioning all of the pieces should be finished to size right within the prescribed limits.

Occasionally, however, an abnormal condition may arise causing off-size grinding from one of the grinding units or perhaps from all of the grinding units and in this event the pieces off size are picked out and separated from those of right size.

Optionally guideways of the test pieces are made with laterally adjustable sides for easy adjustment for use with pieces of different external diameters and the reciprocating pin member is made with a demountable head so that it can be displaced to substitute a pin having different external diameters, as indicated at 42 and 43 respectively for use with pieces intended to have different internal diameters.

Actual maximum diameters of the first and second steps of the pin are determined by the permissible limit of variations in the size of the bores, and are respectively the minimum and maximum permissible diameters when the pieces are to be sorted into three divisions as illustrated in the figures where all pieces of right size are thrown into the intermediate chute 19, all that are too small into the upper chute and all that are too large into the lower chute.

A desirable form of my invention is shown in Figures 5 to 7.

In this form the plunger carrying the stepped gauge reciprocates horizontally and drops the pieces into vertical chutes, 18', 19' or 20', according to bore, dispensing with the delivery plunger 25 of the form of Figure 1.

The test pieces are fed by hand or otherwise into a vertical supply chute 39' and the horizontal plunger 10' carrying the stepped pin gauge at its forward end is made to reciprocate in any suitable way, as by hand or by mechanism connected to an automatic internal grinder.

The reciprocating gauge carries the pieces away from the bottom of the supply pile on the forward strokes, moving them forward distances determined by piece bore, latch members 44 at opposite sides of the delivery path preventing the pieces from being carried back when the plunger moves back, so that pieces fall into the proper chute at plunger withdrawal.

There is a pair of latch members at the top of each delivery chute, the members of each pair being at horizontally opposite sides of the delivery path of the pieces.

Each latch member is spring-pressed inwardly at 45, yields outwardly to pass pieces carried by the plunger, and springs inwardly to trap the pieces in forward position.

I illustrate an auxiliary feed pin 46 connected by a suitable chain 47 to the reciprocating plunger.

When the main plunger travels rearwardly a sufficient distance the auxiliary pin 46 is pulled back against the action of a spring 48 permitting the column of pieces to drop down upon the main plunger.

Before the pin gauge has carried a piece away from the bottom of the column, the auxiliary feed pin springs back into position to engage the bore of the next piece, thus supporting the column during the reciprocation of the main plunger.

Optionally the feed pin 46 may be dispensed with, in which event the weight of the pieces in the storage column comes upon the gauge pin during a portion of each forward and return stroke and it is necessary to smooth out the top portions of the successive shoulders that are presented by the stepped pin gauge, so that the pin may slide easily along the bottom of the supported column.

I have illustrated this in Figure 8 where the supply column rests much of the time along the smoothly cut top portion 49 of the pin gauge, the surfaces at the successive shoulders having been cut away at the top to permit easy sliding engagement between the pin and the successive bottom pieces of the supply column.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:

1. In a device for sorting bored pieces according to bore, a reciprocating plug gauge having successive sections from its forward end of successively greater size, said gauge being adapted to enter the bore of one of the pieces to be sorted while moving forwardly from its rear position and to engage and carry said piece on one or other of said sections according to its bore, in combination with means for preventing rearward travel of the piece during the rearward stroke of the gauge.

2. In a device for sorting bored pieces according to bore, a reciprocating plug gauge having successive sections from its forward end of successively greater size and means synchronized with the reciprocation for placing the unsorted parts one after another in bore registry with the forwardly moving gauge, adapted to place a piece with its bore in front of the gauge after each rearward stroke so that during the succeeding forward stroke the piece is engaged and carried at one or other of said sections according to its bore, in combination with means for preventing rearward travel of the piece during the rearward travel of the gauge.

3. In a device for sorting bored parts according to bore, a reciprocating plug gauge having successive sections on its forward end of successively greater size, said gauge being adapted to enter the bore of one of the pieces to be sorted while moving forwardly from its rear position and to engage and carry said piece on one or other of said sections according to its bore, in combination with delivery chutes respectively adjacent the forward positions of the respective sections and means for preventing rearward travel of the piece from its forward position during the rearward stroke of the gauge until the gauge has moved back out of the way, the piece then delivering into the adjacent chute.

4. In a device for sorting bored pieces according to bore, a reciprocating plug gauge having successive sections on its forward end of successively greater size, a supply tower for holding a supply of unsorted pieces, mechanism operative once each reciprocation of the gauge for delivering a piece from the bottom of the supply in the tower to a position in front of the gauge while the gauge is in rear position so that during the succeeding forward stroke of the gauge the piece is engaged and carried at one or other of said sections according to its bore, and means for preventing return travel of the piece during return travel of the gauge.

5. In a device for sorting bored pieces according to bore, a guideway, a supply runway transverse to and ending in the guideway and adapted to hold a supply of forwardly pressing work pieces with one of the supply in the guideway, a reciprocating step plug gauge adapted to reciprocate across the guideway, a plunger operating synchronously with the gauge and adapted to deliver the piece in both the supply column and guideway to a position in front of and in bore registry with the gauge when the gauge is in its rearward position so that the piece is moved forward by the forward stroke of the gauge, and means for preventing return movement of the piece until the gauge upon its return stroke has moved back out of the way and to deliver the piece into a receptacle, which is a different receptacle, according to the distance moved.

6. A vertical reciprocating plug gauge having step sections at its forward end, a horizontal guideway across the path of the gauge and above the gauge when the gauge is in its low position, a plunger operating in the guideway, means for delivering a work piece into the guideway while the plunger is in its rearward position, the plunger being adapted to forwardly position the work piece to bore registry with and in front of the step gauge while the step gauge is at low position, means for preventing downward movement of a work piece lifted by the gauge during the return stroke of the gauge and mechanism for delivering the sorted pieces out of the path of the gauge.

7. A vertical reciprocating plug gauge having step sections at its forward end, a horizontal guideway across the path of the gauge and above the gauge when the gauge is in its low position, a plunger operating in the guideway, means for delivering a work piece into the guideway while the plunger is in its rearward position, the plunger being adapted to forwardly position the work piece to bore registry with and in front of the step gauge while the step gauge is at low position, means for preventing downward movement of a work piece lifted by the gauge during the return stroke of the gauge and mechanism carried by the plunger for delivering the sorted pieces out of the path of the gauge.

CLIFFORD T. RAULE.